Sept. 24, 1963 T. W. KNACKE ETAL 3,104,856
PARACHUTE
Filed July 21, 1961 3 Sheets-Sheet 1

INVENTOR:
Theodore W. Knacke
Peter A. Leonard
By Keith D. Beecher
Attorney

Sept. 24, 1963 T. W. KNACKE ETAL 3,104,856
PARACHUTE

Filed July 21, 1961 3 Sheets-Sheet 3

INVENTORS:
Theodore W. Knacke
Peter A. Leonard

United States Patent Office 3,104,856
Patented Sept. 24, 1963

3,104,856
PARACHUTE
Theodore W. Knacke, Los Angeles, and Peter A. Leonard, Torrance, Calif., assignors, by mesne assignments, to Itek Corporation, Lexington, Mass., a corporation of Delaware
Filed July 21, 1961, Ser. No. 125,807
1 Claim. (Cl. 244—145)

The present invention relates to parachutes, and it relates more particularly to a new and improved type of parachute having general utility.

As is well known, a parachute is a flexible, lightweight structure usually having the general form of an oblate hemisphere and functioning as a decelerator or air-braking device. The usual parachute assembly includes a canopy and a plurality of suspension lines attached to the periphery of the canopy.

The canopy of most prior art parachutes is composed of a continuous membrane. This membrane relies upon the pressure differential across its surface to maintain its inflated shape. This differential, of course, is created by the entrapment of an air mass on the inside surface of the canopy and a moving mass of air on the outside surface of the canopy.

The parachute of the present invention, unlike the prior art assemblies referred to above, is constructed so that its canopy is formed by a plurality of strips of material; rather than by a continuous membrane formed from a multitude of small cut segments joined together in accordance with usual prior art practice. These strips, in an embodiment to be described, extend from the rim of the canopy over the crown to the opposite side of the rim to have an over-all configuration resembling the spokes of a wagon wheel. A ring-shaped piece of fabric extends around the periphery of the canopy to hold the spokes together and provide a smooth rim for the canopy.

The construction described above results in a parachute which combines good stability, low opening shock, and relatively high drag, with low fabrication time and cost.

The improved parachute to be described is especially useful for high altitude parachute descent systems, for example, for meteorological and sampling investigations. The parachute of the invention is also useful as a stable decelerator vehicle for aircraft or missiles, or for aerial delivery.

The parachute of the invention may be formed from conventional parachute material; and it is particularly suited for fabrication from glass fiber, or other inorganic materials such as, for example, woven metal or coated woven metal. This is because the parachute of the invention requires minimum sewing.

It is, accordingly, an object of the present invention to provide an improved lightweight parachute which exhibits all the performance characteristics of the present-day high performance parachutes, and which can be fabricated more quickly and expeditiously, and at a much lower cost.

Another object of the invention is to provide such an improved parachute which is extremely reliable in its operation, and yet which may be constructed in a simple and inexpensive manner.

Yet another object of the invention is to provide such an improved parachute which exhibits an extremely low opening shock.

Other objects and advantages will become apparent upon a consideration of the following specification, when taken in conjunction with the accompanying drawings, in which.

Figure 1:
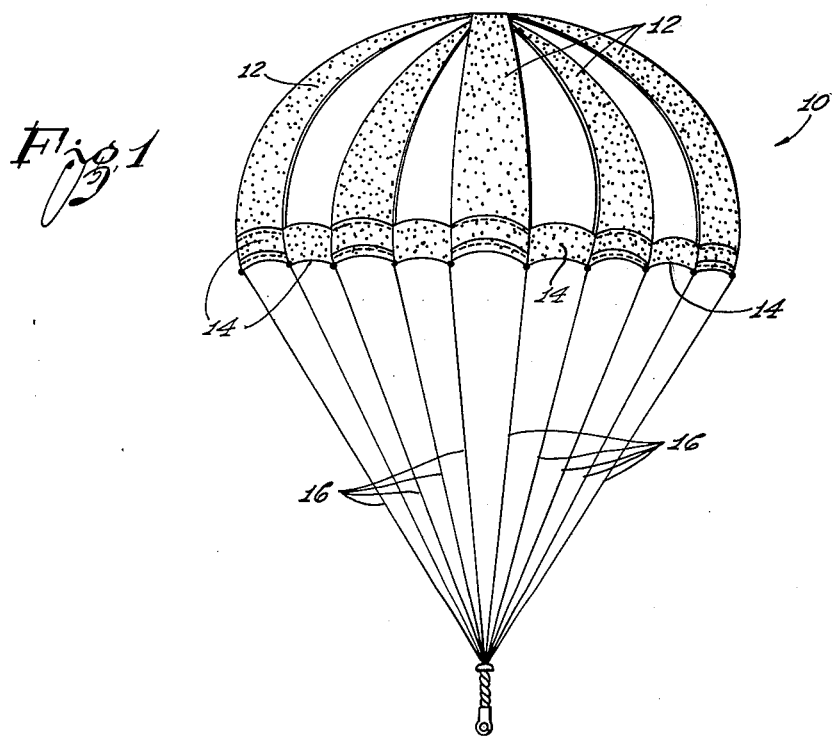
FIGURE 1 is a side view of a parachute constructed in accordance with one embodiment of the invention.

The canopy 10 of the parachute illustrated in FIGURE 1 includes a plurality of strips 12 of material, and it also includes a further strip 14 of material which forms the rim of the canopy. Each of the strips 12 extend from the rim 14 over the crown of the canopy and back to the rim at the diametrically opposite side thereof. It will be appreciated from the views of FIGURES 2, 3 and 4 that the strips forming the canopy of the parachutes constructed in accordance with the invention give the canopy an appearance of a wagon wheel.

Figure 2:
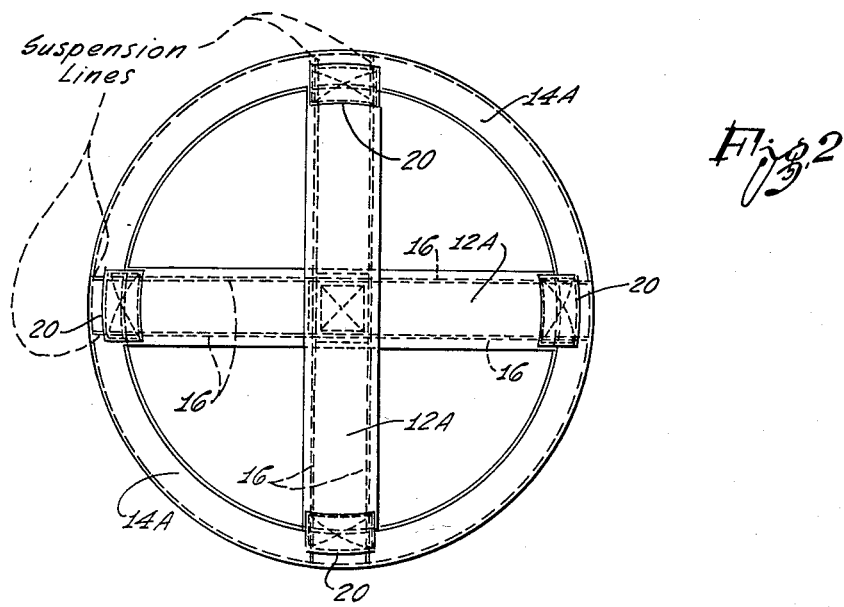
FIGURE 2 is a top plane view of a parachute constructed in accordance with a second embodiment of the invention and which uses, for example, a pair of cross-connected strips of material to form a four-spoke canopy.

A plurality of suspension lines 16 are attached to points around the rim 14. The suspension lines may be attached to the outer edges of the spoke strips 12, as shown in FIGURE 2, and may extend up over the crown of the canopy. However, any other suitable attachment for the suspension lines may be used.

Figure 3:
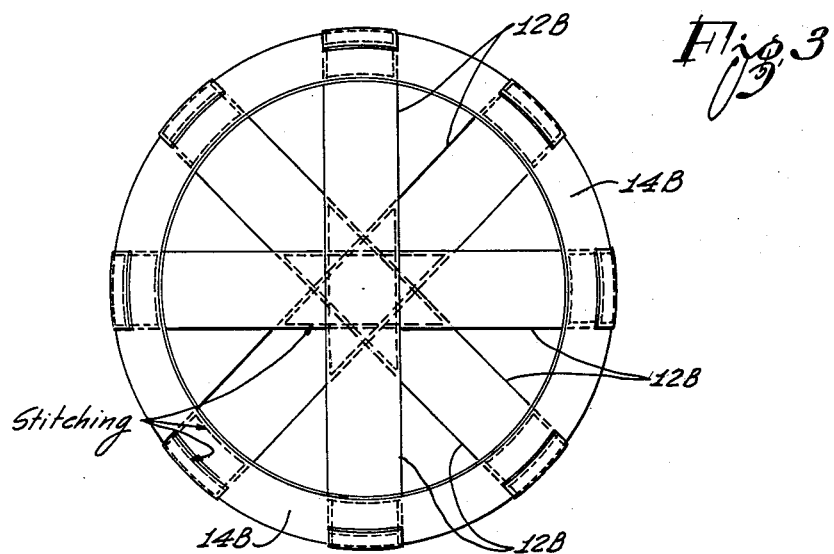
FIGURE 3 is a top plane view of an embodiment of the invention similar to the embodiment of FIGURE 1, the embodiment of FIGURE 3 using, for example, four diametrically extending strips to form an eight-spoke canopy.
Figure 4:
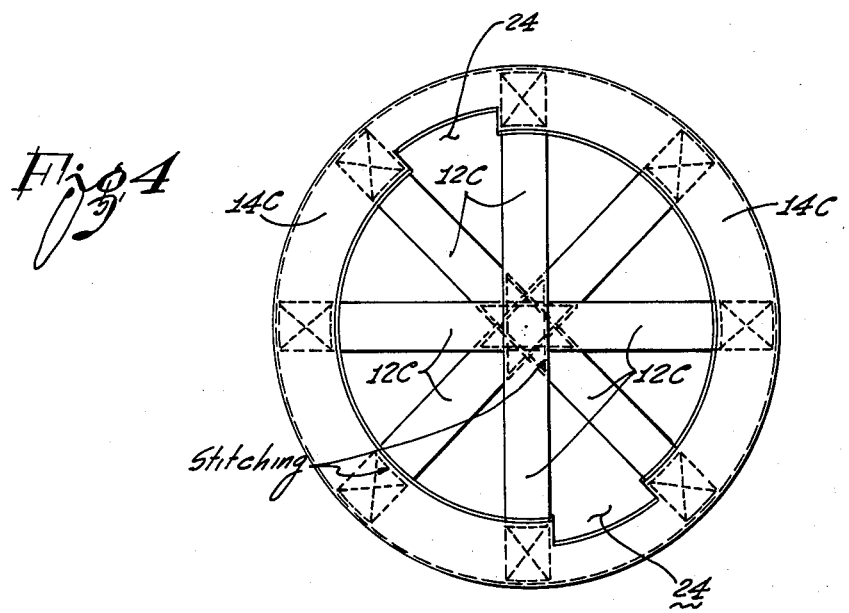
FIGURE 4 is a top plane view of a parachute assembly generally similar to the assembly of FIGURES 1 and 3, but which has been modified to form irregular openings in the canopy.

The plane form of the canopy 10 may be circular, as shown in FIGURES 2, 3 and 4; or it may have any other desired shape. Moreover, parachutes constructed in accordance with the teaching of the present invention may be fabricated with a flat, hemispherical, elliptical, conical or any other desired cross-section.

The number of "spokes" forming the canopy 10 may be four, as shown by the strips 12a in FIGURE 2; eight, as shown by the strips 12b in FIGURE 3 or 12c in FIGURE 4; or any even or odd number of spokes, as is desired for any particular application. In fact, any desired size or width of the rim strip; any desired size, width or number of spoke strips; and any desired size or number of openings formed by the rim and spoke strips can be used to obtain any particular parachute assembly having particular desired porosity and strength.

As shown in FIGURES 1–4, the arrangement of the spoke strips 12, 12a, 12b, 12c and the rim strips 14, 14a, 14b, 14c, results in a plurality of generally triangular-shaped openings in the canopy of the parachute. These openings provide the required porosity in the canopy for obtaining a high degree of stability and low opening shock. A vent opening may also be provided at the crown of the parachute, if so desired. This latter vent opening may be used further to increase stability and further to decrease opening shock, or it can be used merely to decrease the amount of material required in the parachute canopy.

It is evident that the disclosed construction of the parachute of the invention results in extremely low fabrication costs. This is because the parachute canopy of the invention can be formed merely by using full width material, or by cutting a strip of material into predetermined lengths and stitching, or otherwise attaching the lengths together into the desired spoke and rim configuration.

This results in a minimum of cutting and stitching operations and in practically no waste in the canopy material; and it eliminates any need to cut the material into awkward shapes which are difficult to handle, as is the case in the prior are construction.

The material forming the strips referred to above and illustrated in FIGURES 1–4 can be any suitable textile, plastic, paper or any other appropriate material. As noted moreover, the strips may be formed of glass fiber, or other inorganic material. Also, the strips may be formed from woven metal, as suggested. Connection of the individual spokes of the canopy of the invention to the rim may be made, for example, by grommets, metal connectors, rivetting, bonding, or by any other appropriate means.

FIGURE 2 shows a parachute canopy constructed in accordance with the invention and having four spokes formed by the strips 12a, each of which is attached to the rim strip 14a. In the embodiment of FIGURE 2, the spoke strips 12a terminate at the inner edge of the rim strip 14a, and separate pieces of material 20 are stitched to the spoke strips 12a and to the rim strip 14a to attach the spoke strips to the rim strip. As mentioned in the preceding paragraph, other means of attachment may be used.

As noted above, the suspension lines 16, in the embodiment of FIGURE 2, are attached to the edges of each spoke strip 12a, for example, in corresponding seams in the strips 12a. The suspension lines in this embodiment extend up over the crown of the canopy.

In the embodiment of FIGURE 3, the spoke strips 12b extend to the outer edge of the rim strip 14b, and the ends of the spoke strips are looped around the outer edge of the rim strip and stitched, or otherwise attached, to the rim strip, as in the embodiment of FIGURE 1. The rim strip, therefore, forms double layers of material with the spoke strips at the cross-over points.

It should be noted that in all the illustrated embodiments, the spoke strips of the canopy form multiple layers of material at the crown of the parachute. This is a distinct advantage because it provides substantial reinforcement in the canopy at the very point at which maximum strength is required.

In FIGURE 4, the spoke strips 12c extend to the outer edge of the rim strip 14c and are attached to the rim strip 14c without overlapping. If desired, the rim strip can be in the form of arcuate sections connected between adjacent spoke strips. It will be appreciated, of course, that there are many different ways in which the spoke strips can be secured to the rim strip to constitute a canopy constructed in accordance with the present invention. The different illustrated configurations are shown as being merely typical, and are naturally not intended to limit the invention in any way.

A parachute embodying the principles of the present invention can be constructed, as shown in FIGURE 4, so that the openings therein have different areas and shapes. This enables the parachute to exhibit particularly desired characteristics. The differential opening construction of FIGURE 4 is achieved merely by cutting away a portion of the rim strip 14c, as shown at 24; or by cutting away portions of the spoke strips.

Figure 5:
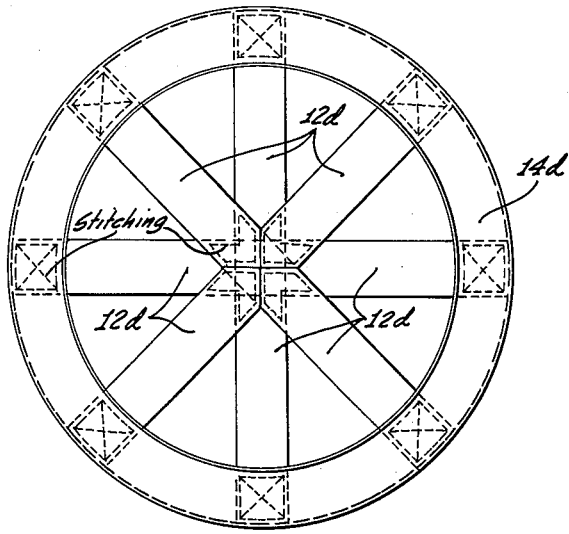
FIGURE 5 is a top plane view of a parachute assembly generally similar to the previous assemblies but having a modified crown construction.

In the embodiment of the invention shown in FIGURE 5, the spoke strips 12d are attached to the rim strip 14d in a manner similar to that of FIGURE 4. In this embodiment certain ones of the spoke strips 13d are cut in the illustrated configuration in order to avoid and excessive concentration of material at the crown of the parachute.

In the particular embodiment of FIGURE 5, four of the spoke strips 12d extend across the entire diameter of the shroud, and four others are cut in the illustrated shape for the above-mentioned reasons. Of course, the spoke strips may have other shapes to avoid the excessive concentration of material at the crown.

Figure 6:
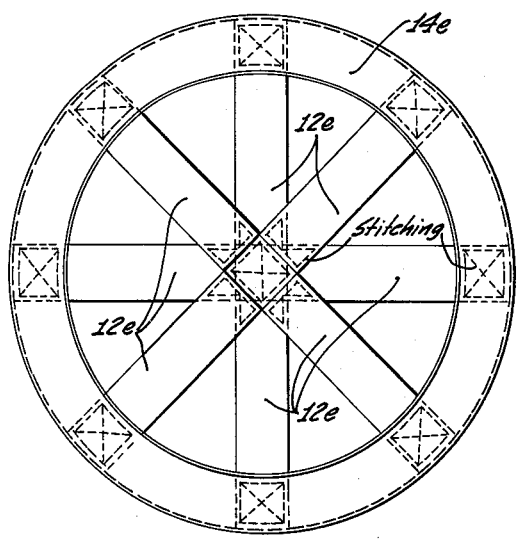
FIGURE 6 is a top plane view of yet another assembly generally similar to that of FIGURE 5.

In FIGURE 6, for example, the spoke strips 12e extend across the area enclosed by the rim strip 14e. In this latter embodiment, four of the spoke strips 12e extend across the area, and four others are cut to have a fore-shortened configuration, as shown.

The invention provides, therefore, an improved paracute assembly which has general utility, and which is particularly suited for high altitude parachute descent systems for aircraft, missile and aerial deliveries.

As described, the parachute of the invention is most advantageous in that it exhibits a high degree of stability and low opening shock. The parachute of the invention is capable of exhibiting the same high stability and low opening shock characteristics of the complex and expensive prior art ribbon, ring slot or guide surface parachutes. Yet, the parachute of the invention can be fabricated at a fraction of the cost of such prior art parachutes.

While particular embodiments of the invention have been shown and described, modifications may be made. The following claim is intended to cover all such modifications as fall within the scope of the invention.

What is claimed is:

A parachute assembly having a canopy and including an annular strip of material forming a rim for the canopy; a plurality of radial strips of material secured to said annular strip at spaced angular positions around said annular strip and extending to the crown of the canopy and configured to prevent excessive concentration of material at the crown of the canopy, said radial strips being angularly displaced from one another to provide a plurality of voids in the canopy, said annular strip configured to provide different areas for at least some of said voids; and a plurality of suspension lines secured to said strips.

References Cited in the file of this patent

UNITED STATES PATENTS

| | | |
|---|---|---|
| 1,774,441 | Malmer | Oct. 7, 1930 |
| 2,119,183 | Sedlmayr | May 31, 1938 |
| 2,458,264 | Hart | Jan. 4, 1949 |
| 2,500,170 | Fogal | Mar. 14, 1950 |
| 2,745,615 | Fogal | May 15, 1956 |
| 2,997,263 | Fouchon | Aug. 22, 1961 |

FOREIGN PATENTS

| | | |
|---|---|---|
| 978,042 | France | Nov. 22, 1950 |